Oct. 16, 1923.
J. A. DIENNER
TOY
Filed Aug. 25, 1920
1,471,147
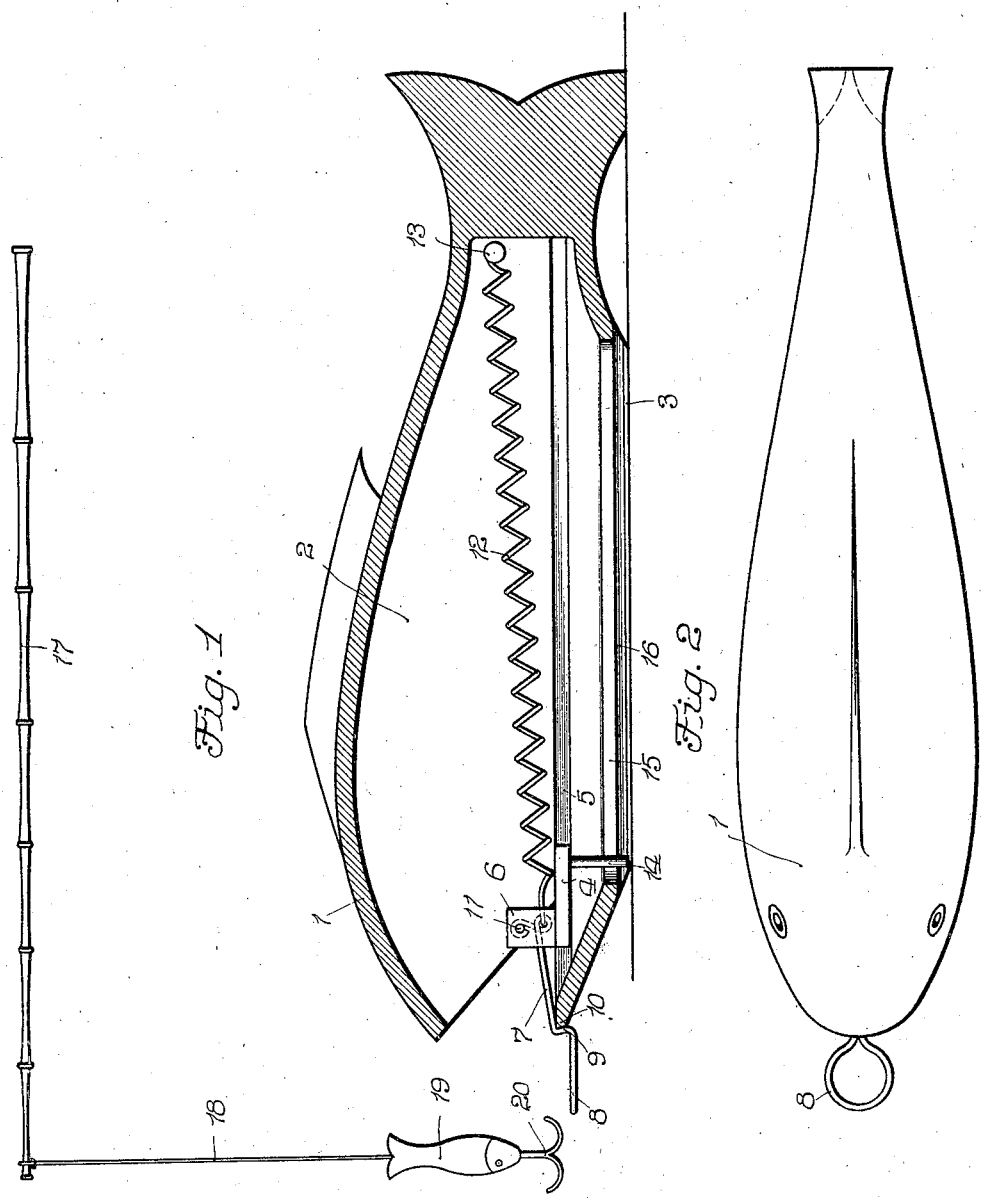
Inventor
John A. Dienner
By Brown, Bortlene-Dienner
Attorneys.

Patented Oct. 16, 1923.

1,471,147

UNITED STATES PATENT OFFICE.

JOHN A. DIENNER, OF CHICAGO, ILLINOIS.

TOY.

Application filed August 25, 1920. Serial No. 405,880.

*To all whom it may concern:*

Be it known that I, JOHN A. DIENNER, a citizen of the United States, residing at Chicago, in the county of Cook and State of Illinois, have invented a certain new and useful Improvement in Toys, of which the following is a full, clear, concise, and exact description, reference being had to the accompanying drawings, forming a part of this specification.

My invention relates to toys and more particularly to a toy animal.

An animal toy to be attractive to children must possess first of all a fairly faithful representation of form and coloring of the animal which it represents. In order for it to retain the child's interest the toy must be given one of the distinctive or characteristic actions of the animal represented.

My invention aims to provide an improved animal toy representing a fish which "bites" upon bait or a hook.

The invention is not to be limited to employment in a fish only but may be embodied in any kind of animal figure desired.

In the accompanying drawings which form a part of the present specification, I have illustrated an embodiment of my invention.

Figure 1 is a longitudinal section of the toy;

Figure 2 is a plan view of the toy; and

Figure 3 is a view of the rod, line and hook.

The body 1 of the toy is shaped and painted to represent a typical form of fish or the like.

The body is made preferably of wood and may be formed in two parts and joined together longitudinally in the middle, as will be understood by those skilled in the art. The body 1 is hollowed out as shown at 2 to provide a body cavity and to make the toy lighter. The fish is preferably made to float in proper position in the water and a strip of lead as shown at 3 forming a keel is attached to the lower side of the body to make the fish sit properly in the water. The bottom of the figure is flattened off to form a base permitting the fish to remain in proper position when lying on a flat support, as on a floor.

In the body cavity a slider 4 is mounted on a suitable guide 5. The guide shown consists of a pair of longitudinal grooves cut on opposite sides of the body cavity, but it is to be understood that the form of the guide and of the slider may be varied within the limits of the invention. The slider 4 has a pair of lugs 6 between which is pivoted an engagement arm or ring member 7. This ring member 7 is formed of wire, or a sheet metal stamping, having an engaging member in the shape of a loop or ring 8 extending out of the mouth of the fish and having a shoulder 9 forming a detent which is adapted to hook over the bottom side wall 10 of the mouth of the fish.

The inner end of the ring member 7 is pivoted at 11 between the lugs 6. A spring 12 is attached to the ring member 7 between the pivot and the detent 9, the ring member forming a second class lever. The other end of the spring is attached at the rear of the body cavity 2 as shown at 13. A rubber or elastic strip may be used instead of a spring. The slider 4 has a pin 14 projecting down thru a slot 15 to the exterior of the body. The pin is of such a length that it does not strike the floor when the body is set in the position shown. A groove 16 surrounds the slot 15 and permits the fingers of the operator to engage and move the pin 14 in the slot 15. A fishing pole 17 having a suitable line 18 with hook 20 and bait 19 is provided for "catching" the fish. Various types of hooks 20 and bait 19 may be provided.

The operation of the toy is as follows: Assume that the slider 4 is moved to the position shown in Figure 1 and that the ring lever 7 has the shoulder 9 caught on the wall 10. The spring 12 tends to hold the shoulder 9 against the edge of the wall 10 and also tends to draw the slider 4 to the rear. The fish is then set up on the floor as shown or is put in the water, as may be desired. The bait 19 and the hook 20 is dangled in front of the fish until one of the prongs of the hook comes under or catches the ring 8. The pole 17 is then given a jerk and this throws the ring 8 upward releasing the catch 9 from the wall 10 permitting the spring 12 to draw the slider 4 to the rear. At the same time the spring 12 being attached to the body at 13 draws the body forward and the consequence of these actions is to cause the bait to disappear in the body cavity 2 and the fish appears to leap for the bait. To disengage the fish from the hook the pin 14 is pushed forward until the catch 9 automatically hooks over the shoulder 10. The catching operation may then be repeated.

In practice I have found that the toy may be employed in a game in which a school of fish are employed. The children engaged in the game may employ the same or different poles 17 and the different fishes may be given different values or numbers.

I do not intend to be limited to the details of construction shown and described as they may be varied without departing from the invention.

I claim:

1. In combination, a hollow body member, a spring having one end secured in said member, a movable engaging piece substantially horizontally extending out of the body member, said piece having a detent, said spring being connected to said piece and being adapted to draw said piece into the body member when the detent is released and means for moving said engaging piece forward against the tension of the spring.

2. In combination, a hollow body member, a slider in said body member, an engaging piece pivoted to said slider, and extending out of said body member, said engaging piece having detent means adapted to be released by movement of the engaging piece and a spring for retracting said slider to move said engaging piece into said body member.

3. In combination, a hollow body member, a slider in said body member, detent means pivoted to said slider, and extending out of said body member, said detent means coöperating with the body member adapted to be released by movement thereof and a spring for retracting said slider, and a manual member connected to said slider and extending out of said body cavity for moving said slider forward against the tension of the spring.

4. In combination, a hollow body member, a slider in said member, an engaging piece having pivotal connection with said slider, said engaging piece having a loop extending substantially horizontally from the front end of the body member, detent means controlling said engaging piece and a spring for drawing said slider into said body.

5. In combination, a hollow body member, a slider in said member, detent means having pivotal connection with said slider, said detent means controlling said slider, a spring for drawing said slider into said body, and manual means connected to said slider for moving the slider forward against the tension of said spring.

6. In combination, a hollow body member, an engaging piece extending out of said member and being adapted to be engaged by a hook, detent means cooperating with a shoulder on the front end of the body member, for holding said piece, said detent means being released by movement of the engagement piece and a spring for retracting the engagement piece and hook into said body member.

7. In combination, a hollow body member, a slider guided in said body member, a lever having an engaging ring upon its outer end, said lever being pivoted at its inner end and having a detent portion for engaging a stationary projection on the body member, a spring connected to said lever and to the inside of the body member, said spring serving to hold the detent portion against said projection and serving to retract said slider, said body member having a slot and a pin connected to said slider and extending thru said slot.

In witness whereof, I hereunto subscribe my name this 23 day of August, A. D. 1920.

JOHN A. DIENNER.